United States Patent
Kim

(10) Patent No.: US 7,593,853 B2
(45) Date of Patent: Sep. 22, 2009

(54) BASEBAND MODEM FOR SPEECH RECOGNITION AND MOBILE COMMUNICATION TERMINAL USING THE SAME

(75) Inventor: Chan Woo Kim, Gyeonggio-do (KR)

(73) Assignee: LG Electronics Inc., Seoul (KR)

(*) Notice: Subject to any disclaimer, the term of this patent is extended or adjusted under 35 U.S.C. 154(b) by 781 days.

(21) Appl. No.: 11/221,463

(22) Filed: Sep. 7, 2005

(65) Prior Publication Data
US 2006/0053011 A1  Mar. 9, 2006

(30) Foreign Application Priority Data
Sep. 7, 2004  (KR)  ............... 10-2004-0071327

(51) Int. Cl.
*G10L 21/06* (2006.01)
(52) U.S. Cl. .................................. 704/251
(58) Field of Classification Search .......... 704/251
See application file for complete search history.

(56) References Cited

U.S. PATENT DOCUMENTS

| | | | |
|---|---|---|---|
| 5,166,971 A | | 11/1992 | Vollert |
| 6,212,228 B1 * | | 4/2001 | Vlajnic ............... 375/222 |
| 6,321,195 B1 | | 11/2001 | Lee et al. |
| 6,411,926 B1 | | 6/2002 | Chang |
| 6,633,845 B1 * | | 10/2003 | Logan et al. ............ 704/255 |
| 7,085,710 B1 * | | 8/2006 | Beckert et al. ........... 704/201 |
| 7,203,643 B2 * | | 4/2007 | Garudadri ............... 704/233 |
| 7,221,902 B2 * | | 5/2007 | Kopra et al. ............ 455/3.05 |
| 7,283,955 B2 * | | 10/2007 | Liljeryd et al. ............ 704/219 |
| 2003/0061042 A1 | | 3/2003 | Garudadri |

FOREIGN PATENT DOCUMENTS

| | | |
|---|---|---|
| EP | 1044119 | 10/2000 |
| JP | 04-207551 | 7/1992 |
| JP | 2001-142488 | 5/2001 |
| JP | 2002-209273 | 7/2002 |
| KR | 1020010008073 A | 2/2001 |

\* cited by examiner

*Primary Examiner*—Susan McFadden
(74) *Attorney, Agent, or Firm*—Lee, Hong, Degerman, Kang & Waimey

(57) ABSTRACT

A baseband modem and method for voice recognition and a mobile communication terminal using the baseband modem and method are disclosed. A speech recognition rate may be increased by selecting a sampling rate suitable for speech recognition and portions of the speech recognition process may be implemented in hardware. The present invention includes an audio codec modulating a received voice signal using either a sampling rate for speech recognition or a sampling rate for voice communication. A feature vector extraction block extracts one or more feature vectors from the modulated voice signal and a speech recognition block performs speech recognition using an extracted feature vector when the voice signal is determined as a voice command. A vocoder vocodes an output of the audio codec when the voice signal is determined as voice communication.

44 Claims, 3 Drawing Sheets

BASEBAND MODEM FOR SPEECH RECOGNITION AND MOBILE COMMUNICATION TERMINAL USING THE SAME

CROSS-REFERENCE TO RELATED APPLICATIONS

Pursuant to 35 U.S.C. § 119(a), this application claims the benefit of earlier filing date and right of priority to Korean Application No. 10-2004-0071327, filed on Sep. 7, 2004, the contents of which is hereby incorporated by reference herein in their entirety:

BACKGROUND OF THE INVENTION

1. Field of the Invention

The present invention relates to a baseband modem and method for speech recognition, and more particularly, to a baseband modem and method for speech recognition and a mobile communication terminal using the baseband modem and method. Although the present invention is suitable for a wide scope of applications, it is particularly suitable for securing a higher rate of speech recognition.

2. Description of the Related Art

Generally, a conventional baseband modem includes an audio codec. Conventional speech recognition technology, as applied to a mobile communication terminal, generally utilizes the same sampling rate for both vocoding of voice communication and voice recognition. The same sampling rate is utilized because there are few baseband modems capable of supporting an input of a 16 kHz microphone and most baseband modems have difficulty obtaining PCM (pulse code modulation) data.

FIG. 1 is a block diagram illustrating a conventional baseband modem. FIG. 2 is a flowchart illustrating a conventional speech recognition method utilizing the baseband modem illustrated in FIG. 1.

Referring to FIG. 1, a conventional baseband modem includes an audio codec 13, a vocoder 15 and a processor 17. Once a voice signal is received from a microphone, the audio codec 13 performs modulation on the voice signal at a prescribed sampling rate. For example, PCM (pulse code modulation) is performed on the voice signal at a sampling rate of 8 kHz.

The vocoder 15 performs vocoding on an output of the audio codec 13. For instance, QCELP (Qualcomm Code Excited Linear Prediction) or EVRC (Enhanced Variable Rate Coding) is performed.

The processor 17 performs speech recognition on an output of the vocoder 15. Specifically, the processor 17 decodes vocoded data and then extracts a feature vector from the decoded data. The processor 17 performs speech recognition by applying the extracted feature vector to a speech recognition algorithm that was previously prepared. Preferably, the processor 17 includes an MPU (micro processing unit) or DSP (digital signaling processor). On the other hand, if the voice signal is for voice communication, the processor 17 performs channel encoding, using either a convolution code or turbo code, on the output of the vocoder 15.

A conventional speech recognition method according to the above-explained configuration is explained with reference to FIG. 2.

Once a voice signal is received from a microphone, the conventional baseband modem performs modulation on the voice signal at a prescribed sampling rate (S12). For example, PCM (pulse code modulation) is carried out on the inputted voice signal at a sampling rate of 8 kHz.

Vocoding of the modulated voice signal is then performed (S14). For example, QCELP (Qualcomm Code Excited Linear Prediction) or EVRC (Enhanced Variable Rate Coding) is utilized for vocoding.

Speech recognition is performed on the vocoded signal in an MPU (micro processing unit) or DSP (digital signaling processor). For speech recognition, vocoded data is decoded (S16) and a feature vector is extracted from the decoded data (S18). The extracted feature vector is then applied to a speech recognition algorithm (S20).

In the conventional method, the sampling rate for modulation is set to 8 kHz. This is because a speech level of a quality that is recognizable can be provided using a voice component below 4 kHz.

However, when performing speech recognition in a mobile communication terminal according to the conventional method, data processed according to sampling for voice communication is used. Therefore, the conventional method is unable to guarantee a satisfactory speech recognition rate. Furthermore, in the conventional method, unnecessary vocoding and decoding are performed as illustrated in FIG. 2.

Optionally, a digital signal processing chip or a speech recognition chip for speech recognition may be included in the mobile communication terminal. However, this increases the cost of a terminal.

In some conventional baseband modems, a method such as DTW (dynamic time warping) has been used for speech recognition. Since the data is processed according to sampling for voice communication, this method fails to guarantee a satisfactory speech recognition rate. In the conventional speech recognition method, either the sampling rate of the audio codec provided in the baseband modem is increased or extracting of the feature vector is not implemented with hardware.

There is another conventional method for speech recognition. In this method, a separate audio codec having a sampling rate suitable for speech recognition is installed outside the baseband modem. However, the corresponding hardware implementation is very complicated.

Conventional mobile communication terminals that perform speech recognition are unable to adjust the sampling rate of the baseband modem by separating voice communication from speech recognition. Furthermore, conventional baseband modems have difficulty obtaining the PCM (pulse code modulation) data.

Therefore, there is a need for an apparatus and method that can perform speech recognition and voice communication such that an optimized sampling rate is utilized for speech recognition to guarantee a satisfactory speech recognition rate without performing unnecessary vocoding and decoding. The present invention addresses these and other needs.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

The invention is directed to a baseband modem and method for speech recognition and a mobile communication terminal using the baseband modem and method. By using a variable sampling rate, a rate optimized for speech recognition is utilized in order to secure a higher rate of speech recognition.

In one aspect of the present invention, a baseband modem is provided. The baseband modem includes an audio codec adapted to modulate a voice signal using one of a first sampling rate and a second sampling rate, means for speech recognition and means for speech encoding. The audio codec encodes the voice signal using the first sampling rate and speech recognition means performs speech recognition of the encoded voice signal if the voice signal is a voice command and the audio codec encodes the voice signal using the second sampling rate and the speech encoding means performs vocoding of the encoded voice signal if the voice signal is voice communication.

Preferably, the speech recognition means includes a feature vector extraction block adapted to extract one or more feature vectors from the encoded voice signal and a speech recognition block adapted to perform speech recognition using an extracted feature vector. It is contemplated that the speech recognition block includes a buffer adapted to store the feature vectors extracted from the encoded voice signal.

It is contemplated that a buffer is provided to store the encoded voice signal, for example, a ping-pong buffer. Preferably, the feature vector extraction block extracts the feature vectors from data stored in the buffer.

Preferably, the feature vector extraction block is implemented in hardware. Alternately, the feature vector extraction block may be implemented in software.

Preferably, baseband modem includes a controller to determine whether the voice signal is a voice command or voice communication. The controller powers on registers of the feature vector extraction block and speech recognition block if the voice signal is a voice command and powers off registers of the feature vector extraction block and speech recognition block if the voice signal is voice communication. The controller determines the sampling rate used by the audio codec.

Preferably, the speech encoding means includes a vocoder adapted to vocode the encoded voice signal. It is contemplated that the second sampling rate is optimized for voice communication, for example, 8 kHz.

Preferably, the first sampling rate is optimized for speech recognition. It is contemplated that the first sampling rate is in a range of approximately 12 kHz to approximately 32 kHz, for example, 16 kHz.

Preferably, the audio codec perform pulse code modulation on the voice signal. Preferably, the baseband modem is implemented in a mobile communication terminal.

In another aspect of the present invention, a mobile communication terminal is provided. The mobile communication terminal includes an audio codec adapted to modulate a voice signal using one of a first sampling rate and a second sampling rate, a feature vector extraction block adapted to extract one or more feature vectors from the modulated voice signal, a speech recognition block adapted to perform speech recognition using an extracted feature vector and a vocoder adapted to vocode the modulated voice signal. The audio codec encodes the voice signal using the first sampling rate if the voice signal is a voice command and the audio codec encodes the voice signal using the second sampling rate if the voice signal is voice communication.

It is contemplated that a buffer is provided to store the encoded voice signal, for example, a ping-pong buffer. It is further contemplated that the mobile terminal includes a buffer adapted to store the feature vectors extracted from the modulated voice signal.

Preferably, the feature vector extraction block is implemented in hardware. Alternately, the feature vector extraction block may be implemented in software. Preferably, the audio codec performs pulse code modulation on the voice signal.

Preferably, mobile communication terminal includes a controller to determine whether the voice signal is a voice command or voice communication, for example, according to a user selection. The controller powers on registers of the feature vector extraction block and speech recognition block if the voice signal is a voice command and powers off registers of the feature vector extraction block and speech recognition block if the voice signal is voice communication. The controller determines the sampling rate used by the audio codec.

Preferably, the second sampling rate is optimized for voice communication. It is contemplated that the second sampling rate is 8 kHz.

Preferably, the first sampling rate is optimized for speech recognition. It is contemplated that the first sampling rate is in a range of approximately 12 kHz to approximately 32 kHz, for example, 16 kHz.

In another aspect of the present invention, a method of performing speech recognition and speech communication in a baseband modem is provided. The method includes determining whether a voice signal is a voice command or voice communication and modulating the voice signal using a first sampling rate and performing speech recognition of the modulated voice signal if the voice signal is determined to be a voice command and modulating the voice signal using a second sampling rate and performing vocoding of the modulated voice signal if the voice signal is determined to be voice communication.

Preferably, speech recognition is performed by extracting one or more feature vectors from the modulated voice signal and performing speech recognition using an extracted feature vector. It is contemplated that the extracted the feature vectors may be stored in a buffer.

It is contemplated that the modulated voice signal may be stored in a buffer. Preferably, the feature vectors are extracted from data stored in the buffer.

Preferably, feature vector extraction is implemented in hardware. Alternately, feature vector extraction may be implemented in software.

Preferably, determining whether the voice signal is a voice command or voice communication is performed according to a user selection. It is contemplated that activation of a feature vector extraction block and a speech recognition block may be controlled such that the feature vector extraction block and speech recognition block are activated if the voice signal is a voice command and the feature vector extraction block and speech recognition block are deactivated if the voice signal is voice communication. Preferably, registers of the feature vector extraction block and speech recognition block are powered on if the voice signal is a voice command and are powered off if the voice signal is voice communication.

It is contemplated that the voice signal is modulated at a first sampling rate optimized for speech recognition. It is contemplated that the first sampling rate is in a range of approximately 12 kHz to approximately 32 kHz, for example, 16 kHz.

It is contemplated that the voice signal is modulated at a second sampling rate optimized for voice communication. Preferably, an 8 kHz rate is used.

Preferably, pulse code modulation is performed on the voice signal. Preferably, the baseband modem is implemented in a mobile communication terminal.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention relates to a baseband modem and method for speech recognition and a mobile communication terminal using the baseband modem and method. Although the present invention is illustrated with respect to a mobile communication device, it is contemplated that the present invention may be utilized anytime it is desired to perform voice recognition and voice communication using optimized sampling rates in order to secure a higher rate of speech recognition.

Reference will now be made in detail to the preferred embodiments of the present invention, examples of which are illustrated in the accompanying drawings. Wherever possible, the same reference numbers will be used throughout the drawings to refer to the same or like parts.

Figure 1:
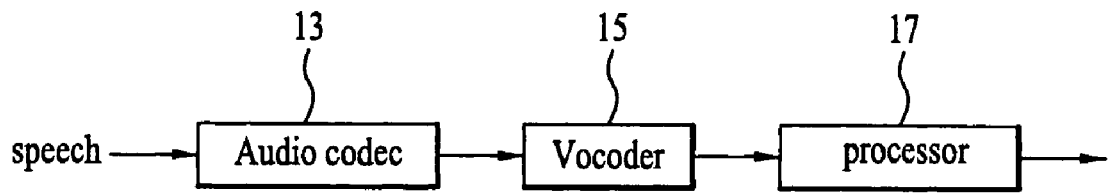
FIG. 1 is a block diagram illustrating a conventional baseband modem.
Figure 2:
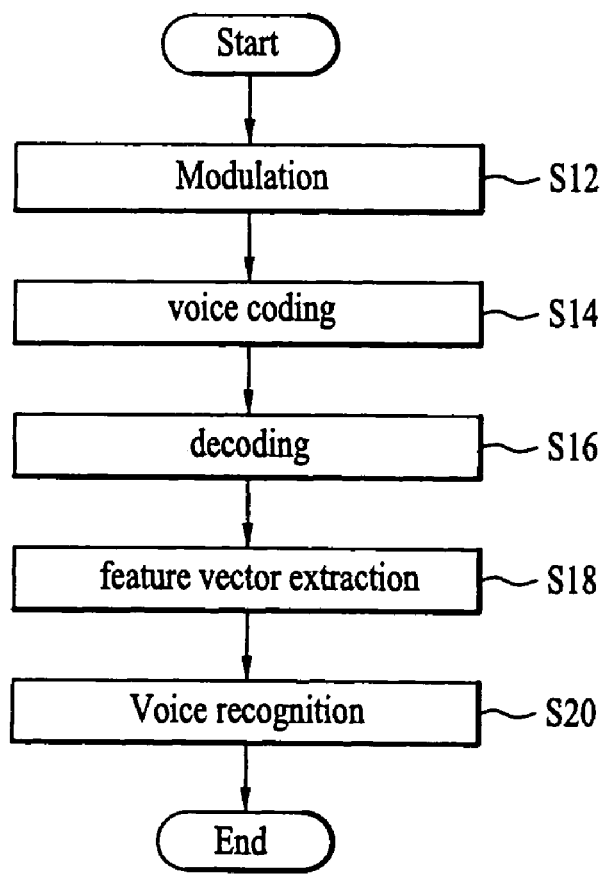
FIG. 2 is a flowchart of a conventional speech recognition method utilizing the baseband modem illustrated in FIG. 1.
Figure 3:
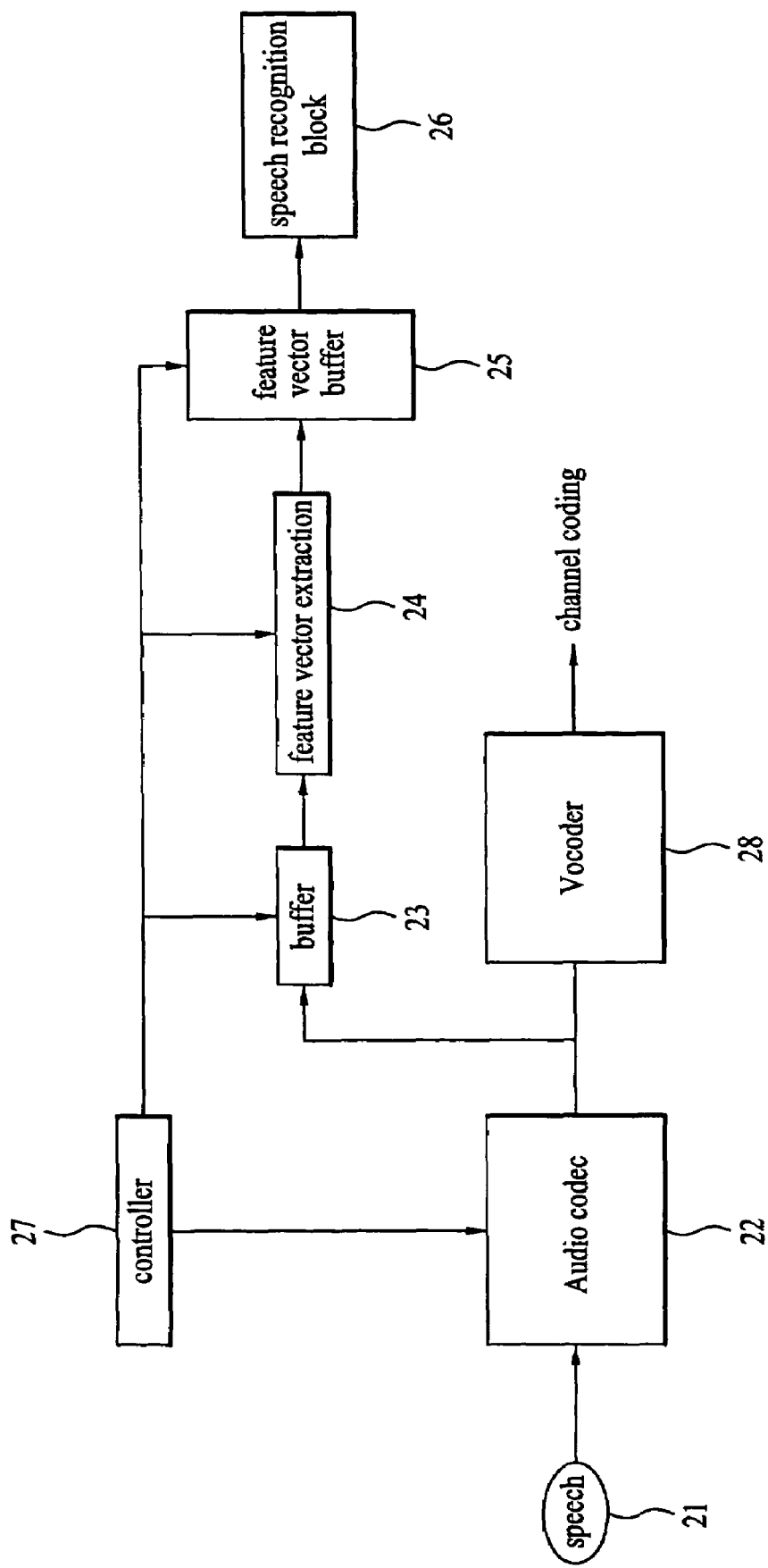
FIG. 3 is a block diagram of a baseband modem according to one embodiment of the present invention.

A baseband modem for voice recognition and mobile communication terminal using the baseband modem according to a preferred embodiment of the present invention is explained with reference to FIG. 3. FIG. 3 is a block diagram illustrating a baseband modem according to one embodiment of the present invention, in which the baseband modem is preferably provided in a mobile communication terminal. Referring to FIG. 3, a baseband modem includes an audio codec 22, a controller 27, a vocoder 28, a feature vector extraction block 24, a plurality of buffers 23 and 25 and a speech recognition block 26.

When a voice signal is received from a microphone, the audio codec 22 performs modulation on the inputted voice signal at a selected sampling rate. The microphone transforms a user voice into an electrical signal. Specifically, the audio codec 22 performs PCM (pulse code modulation) on the voice signal at a selected sampling rate.

The audio codec 22 changes the sampling rate to perform the PCM according to whether the voice signal corresponds to a signal for speech recognition or a signal for voice communication. Specifically, the audio codec 22 applies a sampling rate of approximately 8 kHz to the PCM performed on the voice signal for voice communication. On the other hand, the audio codec 22 applies a sampling rate of 12~32 kHz to the PCM performed on the voice signal for speech recognition.

Preferably, the audio codec 22 applies a sampling rate of 16 kHz to the PCM performed on the signal for speech recognition. This is because it is known that a sampling rate of 16 kHz enhances a speech recognition rate.

A user selects an application to identify whether the voice signal corresponds to a signal for speech recognition or a signal for voice communication. Specifically, if the user selects the application for voice communication, a signal received by the audio codec 22 thereafter corresponds to a voice signal for voice communication. If the user selects the application for speech recognition, a signal received by the audio codec 22 thereafter corresponds to a voice signal for speech recognition.

In the present invention, by determining what type of the application the user selects, the controller 27 activates either a signal transfer path for voice communication or a signal transfer path for speech recognition. Specifically, the controller 27 activates or deactivates elements 23, 24 and 25 of the signal transfer path for speech recognition.

If the user selects the application for speech recognition, the controller 27 activates elements 23, 24 and 25 of the signal transfer path for speech recognition. If the user does not select the application for speech recognition, the controller 27 deactivates elements 23, 24 and 25 of the signal transfer path for speech recognition to cause the output of the audio codec 22 to be transferred to the vocoder 28.

Furthermore, the controller 27 controls the sampling rate of the audio codec 22. Specifically, the controller 27 can determine whether the signal received by the audio codec 22 is for voice communication or for speech recognition according to what type of application the user selects. The controller 27 controls the audio codec 22 to perform the PCM using the sampling rate suitable for each type of application.

An example of a control operation of the controller 27 is explained as follows. Once a user selects an application for speech recognition in order to perform, for example, auto-dialing, menu selection or name paging, the controller 27 powers on particular registers of the baseband modem used for a speech recognition mode. The controller 27 sets the sampling rate of the audio codec 22 to a speech recognition sampling rate, for example, 16 kHz. The coder 27 then powers on the portion of the baseband modem utilized for speech recognition mode, specifically buffer 23, feature vector extraction block 24 and feature vector buffer 25.

In brief, the controller 27 varies the sampling rate used by the audio codec 22 and determines a path for transfer of the output of the audio codec 22 according to the application selected by the user.

In the signal transfer path for speech recognition, an output of the buffer 23 is provided to an input of the feature extraction block 24. The buffer 23 stores a voice signal (PCM data) for speech recognition. Preferably, the buffer 23 is a ping-pong buffer.

Specifically, the ping-pong buffer uses a double buffering structure. In a double buffering structure divided into two storage areas, one of the two storage areas stores data while the other storage area outputs the data stored in the former storage area. Preferably, the present invention uses the double buffering structure or a structure including at least three divided storage areas configuring a ring shape. Furthermore, the buffer 23 includes a 20~40 ms buffer.

The feature vector extraction block 24 receives the PCM data from the buffer 23 and extracts feature vectors from the received PCM data. The feature vector extraction block 24 adopts MFCC (mel-frequency cepstral coefficients), PLP (perceptual linear prediction), LPC (linear predictive coding) or LPCC (linear predictive cepstral coefficients). A feature vector buffer 25 stores the feature vectors extracted by the feature vector extraction block 24. In the present invention, the feature vectors are repeatedly extracted by a short time unit of 20~40 ms and the extracted feature vectors are stored in the feature vector buffer 25 in the form of an array.

Generally, when extracting feature vectors, filter bank, filtering, FFT (fast Fourier transform), DCT (discrete cosine transform) and IFFT (inverse fast Fourier transform) should be conducted. Therefore, a large volume of operations is required for extracting the feature vectors and the feature vector extracting process has strong repeatability.

Preferably, the present invention implements the feature vector extraction block 24 in hardware. However, the feature vector extraction may be implemented in software.

The speech recognition block 26 performs speech recognition using the feature vectors stored in the feature vector buffer 25. Preferably, the speech recognition block 26 includes an MPU (micro-processing unit) or DSP (digital signaling processor) provided with a speech recognition algorithm.

The variability of a speech recognition algorithm is very high. A difference of fixed point implementation may exist according to a training file and parameters. Parts corresponding to Viterbi decoding, language modeling or grammar for the enhancement of the algorithm are used. Therefore, the parts for fixed point implementation or algorithm enhancement in the speech recognition algorithm are implemented via the aforementioned MPU or DSP.

Furthermore, noise cancellation may be performed in the present invention for speech recognition via the MPU or DSP. Preferably, the noise cancellation is executed via the MPU or DSP.

The vocoder 28 performs vocoding on the output (PCM data using the sampling rate of 8 kHz) of the audio codec 22 for voice communication. Specifically, if a voice signal for voice communication is received, the vocoder 28 performs the vocoding using QCELP (Qualcomm code excited linear prediction), EVRC (enhanced variable rate coding), VSELP (vector sum excited linear prediction) or RPE-LTP (residual pulse excitation/long term prediction). Channel coding is performed on an output of the vocoder 28 using convolution code or turbo code. Radio modulation is performed after completion of the channel coding.

Figure 4:
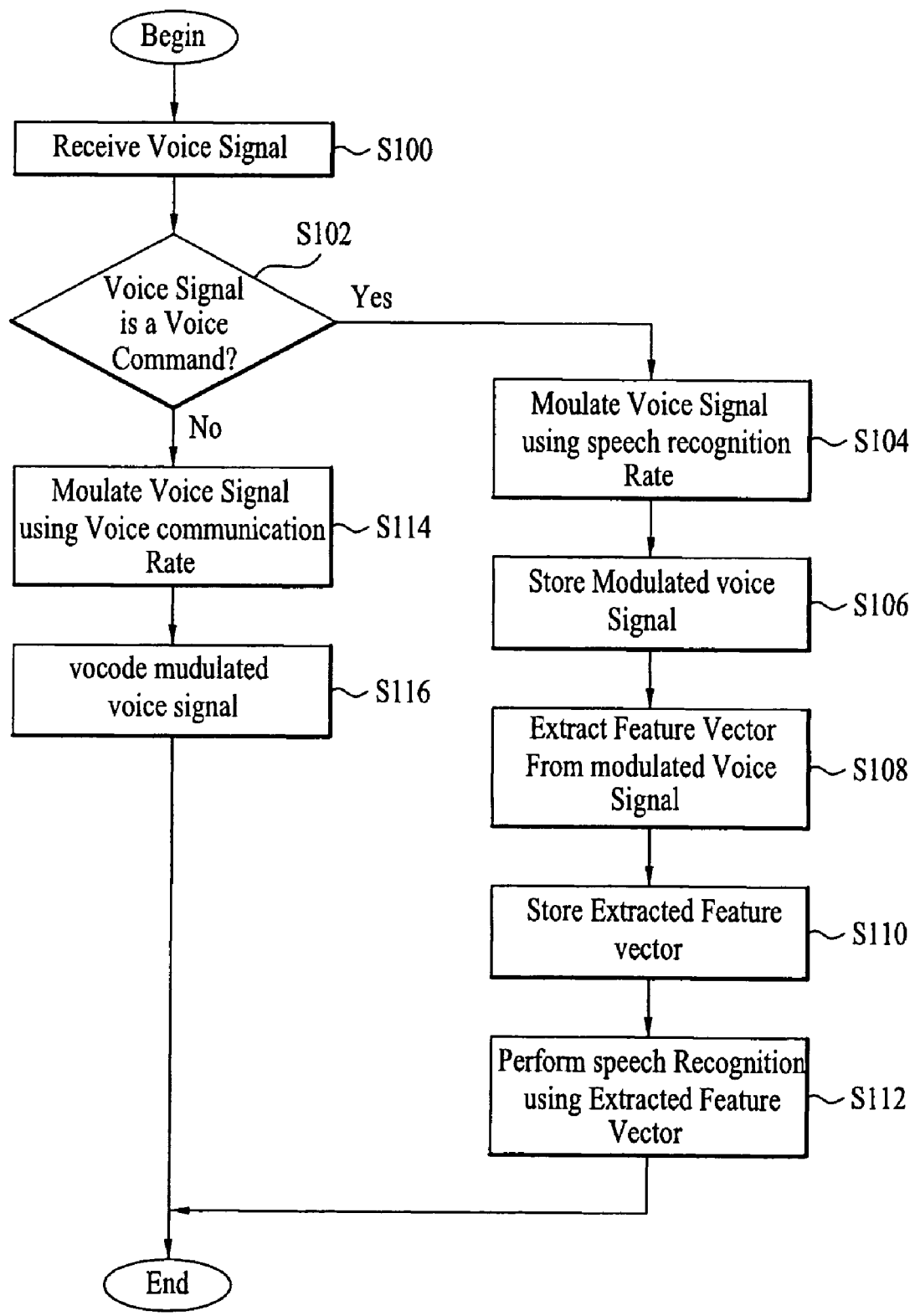
FIG. 4 is a flowchart of speech recognition method according to one embodiment of the present invention.

FIG. 4 illustrates a method for performing speech recognition according to the present invention. The method includes receiving a voice signal (S100), determining whether the voice signal is a voice command or voice communication (S102) and either modulating the voice signal using a rate optimized for speech recognition (S104) and storing the modulated voice signal (S106), extracting a feature vector from the modulated voice signal (S108), storing the extracted feature vector (S110) and performing speech recognition using the extracted feature vector (S112) or modulating the voice signal using a rate optimized for voice communication (S114) and vocoding the modulated voice signal (S116)

Preferably, extracting a feature vector from the modulated voice signal (S108) is implemented in hardware. Alternately, extracting a feature vector from the modulated voice signal (S108) may be implemented in software.

Preferably, the determination of whether the voice signal is a voice command or voice communication (S102) is performed according to a user selection of a type of application. Preferably, pulse code modulation of the voice signal is performed.

Preferably the selection of one of the two paths (S104-S112 and S114-S116) is performed by controlling particular registers related to the feature vector extraction and speech recognition. Specifically, the registers related to the feature vector extraction and speech recognition are activated by applying power if the voice signal is determined to be a voice command (S102) and are deactivated by removing power if the voice signal is determined to be voice communication.

If the voice signal is determined to be a voice command (S102), a rate of approximately 12 kHz to approximately 32 kHz is used for modulating the voice signal, preferably 16 kHz. If the voice signal is determined to be voice communication (S102), preferably a rate of 8 kHz is used for modulating the voice signal.

Preferably, the baseband modem is included in a mobile communication terminal as an internal element when the mobile communication terminal is manufactured. Alternatively, the baseband modem may be implemented as an independent module to be assembled as part of a mobile communication terminal layer. Therefore, it can be understood that the scope of the present invention covers both of the aforementioned alternatives.

The present invention provides several effects or advantages. First, since a sampling rate suitable for speech recognition is utilized when modulation is performed by the audio codec, the speech recognition rate can be enhanced. Second, by implementing the feature vector extraction with hardware, the present invention can reduce the volume of operations of the processing unit for speech recognition and reduce the power consumption. Third, by implementing the fixed point implementation or the algorithm enhancement with the MPU or DSP in the speech recognition algorithm, the present invention facilitates expansion according to future necessity.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A baseband modem comprising:
   an audio codec to modulate a voice signal using a first sampling rate or a second sampling rate;
   means for speech recognition;
   means for speech encoding, wherein the audio codec is to encode the voice signal using the first sampling rate and the speech recognition means is for performing speech recognition of the encoded voice signal, if the voice signal is a voice command, and the audio codec is to encode the voice signal using the second sampling rate and the speech encoding means is for performing vocoding of the encoded voice signal, if the voice signal is voice communication, and wherein the means for speech recognition comprises:

a feature vector extraction block to extract at least one feature vector from the encoded voice signal and a speech recognition block to perform speech recognition using the at least one feature vector extracted by the feature vector extraction block; and a controller to determine whether the voice signal is a voice command or a voice communication and to power on registers of the feature vector extraction block and speech recognition block, if the voice signal is a voice command, and to power off registers of the feature vector extraction block and speech recognition block, if the voice signal is a voice communication.

2. The baseband modem of claim 1, wherein the speech recognition means further comprises a buffer to store the encoded voice signal.

3. The baseband modem of claim 2, wherein the feature vector extraction block is further to extract the at least one feature vector from data stored in the buffer.

4. The baseband modem of claim 2, wherein the buffer comprises a ping-pong buffer.

5. The baseband modem of claim 1, wherein the speech recognition means further comprises a buffer to store the at least one feature vector extracted from the encoded voice signal.

6. The baseband modem of claim 1, wherein the feature vector extraction block is implemented in hardware.

7. The baseband modem of claim 1, wherein the feature vector extraction block is implemented in software.

8. The baseband modem of claim 1, wherein the speech encoding means further comprises a vocoder to vocode the encoded voice signal.

9. The baseband modem of claim 1, wherein the controller is further to determine the sampling rate used by the audio codec according to the determination.

10. The baseband modem of claim 1, wherein the first sampling rate is optimized for speech recognition.

11. The baseband modem of claim 10, wherein the first sampling rate is in a range of approximately 12 kHz to approximately 32 kHz.

12. The baseband modem of claim 11, wherein the first sampling rate is approximately 16 kHz.

13. The baseband modem of claim 1, wherein the second sampling rate is optimized for voice communication.

14. The baseband modem of claim 13, wherein the second sampling rate is approximately 8 kHz.

15. The baseband modem of claim 1, wherein the audio codec is further to perform pulse code modulation on the voice signal.

16. The baseband modem of claim 1, wherein the baseband modem is implemented in a mobile communication terminal.

17. A mobile communication terminal comprising:

an audio codec to modulate a voice signal using a first sampling rate or a second sampling rate;

a feature vector extraction block to extract at least one feature vector from the modulated voice signal;

a speech recognition block to perform speech recognition using the at least one feature vector extracted by the feature vector extraction block;

a vocoder to vocode the modulated voice signal, wherein the audio codec is to encode the voice signal using the first sampling rate, if the voice signal is a voice command and the audio codec is to encode, the voice signal using the second sampling rate, if the voice signal is voice communication; and a controller to determine whether the voice signal is a voice command or a voice communication and to power on registers of the feature vector extraction block and speech recognition block, if the voice signal is a voice command, and to power off registers of the feature vector extraction block and the speech recognition block, if the voice signal is a voice communication.

18. The mobile communication terminal of claim 17, further comprising a buffer to store the encoded voice signal.

19. The mobile communication terminal of claim 18, wherein the buffer comprises a ping-pong buffer.

20. The mobile communication terminal of claim 17, further comprising a buffer to store the at least one feature vector extracted from the modulated voice signal.

21. The mobile communication terminal of claim 17, wherein the controller is further to determine whether the voice signal is a voice command or a voice communication comprises receiving a user selection.

22. The mobile communication terminal of claim 21, wherein the controller is further to determine the sampling rate used by the audio codec according to the determination.

23. The mobile communication terminal of claim 17, wherein the first sampling rate is optimized for speech recognition.

24. The mobile communication terminal of claim 23, wherein the first sampling rate is in a range of approximately 12 kHz to approximately 32 kHz.

25. The mobile communication terminal of claim 23, wherein the first sampling rate is approximately 16 kHz.

26. The mobile communication terminal of claim 17, wherein the second sampling rate is optimized for voice communication.

27. The mobile communication terminal of claim 26, wherein the second sampling rate is approximately 8 kHz.

28. The mobile communication terminal of claim 26, wherein the feature vector extraction block is implemented in hardware.

29. The mobile communication terminal of claim 17, wherein the feature vector extraction block is implemented in software.

30. The mobile communication terminal of claim 17, wherein the audio codec is further to perform pulse code modulation on the voice signal.

31. A method of performing speech recognition and speech communication in a baseband modem, the method comprising:

determining whether a voice signal is a voice command or a voice communication with a controller;

modulating the voice signal with an audio codec using a first sampling rate and performing speech recognition of the modulated voice signals if the voice signal is determined to be a voice command, and modulating the voice signal using a second sampling rate and performing vocoding of the modulated voice signals, if the voice signal is determined to be voice communication, and controlling activation of a feature vector extraction block and a speech recognition block with the controller by powering on registers of the feature vector extraction block and the speech recognition block, if the voice signal is a voice command, and powering off registers of the feature vector extraction block and the speech recognition block, if the voice signal is voice communication.

32. The method of claim 31, wherein performing speech recognition of the modulated voice signal comprises:
   extracting at least one feature vector from the modulated voice signal; and
   performing speech recognition using the at least one feature vector.

33. The method of claim 31, wherein performing speech recognition of the modulated voice signal farther comprises:
   storing the modulated voice signal in a buffer; and
   extracting the at least one feature vector from data stored in the buffer.

34. The method of claim 32, wherein performing speech recognition of the modulated voice signal further comprises storing the at least one feature vector extracted from the modulated voice signal in a buffer.

35. The method of claim 32, wherein extracting the at least one feature vector from the modulated voice signal is implemented in hardware.

36. The method of claim 32, wherein extracting the at least one feature vector from the modulated voice signal is implemented in software.

37. The method of claim 31, wherein determining whether the voice signal is a voice command or a voice communication comprises receiving a user selection.

38. The method of claim 31, wherein the first sampling rate optimized for speech recognition.

39. The method of claim 38, wherein the first sampling rate in a range of approximately 12 kHz to approximately 32 kHz.

40. The method of claim 38, wherein the first sampling rate of approximately 16 kHz.

41. The method of claim 31, wherein the second sampling rate is optimized for voice communication.

42. The method of claim 41, wherein the voice signal using a second sampling rate is approximately 8 kHz.

43. The method of claim 31, further comprising performing pulse code modulation on the voice signal.

44. The method of claim 31, wherein the baseband modem is implemented in a mobile communication terminal.

* * * * *